US012688025B2

(12) United States Patent
Khandelwal et al.

(10) Patent No.: US 12,688,025 B2
(45) Date of Patent: Jul. 21, 2026

(54) ACTOR-CRITIQUE CODE-TO-CODE TRANSLATION

(71) Applicant: International Business Machines Corporation, Armonk, NY (US)

(72) Inventors: Dinesh Khandelwal, Indore (IN); Varad Bhatnagar, Bangalore (IN); Saswati Dana, Bangalore (IN); Amar Prakash Azad, Bangalore (IN); Dinesh Garg, Beawar (IN)

(73) Assignee: International Business Machines Corporation, Armonk, NY (US)

( * ) Notice: Subject to any disclaimer, the term of this patent is extended or adjusted under 35 U.S.C. 154(b) by 291 days.

(21) Appl. No.: 18/466,287

(22) Filed: Sep. 13, 2023

(65) Prior Publication Data

US 2025/0085946 A1     Mar. 13, 2025

(51) Int. Cl.
*G06F 8/51*          (2018.01)
*G06F 8/30*          (2018.01)

(52) U.S. Cl.
CPC ............... *G06F 8/51* (2013.01); *G06F 8/313* (2013.01)

(58) Field of Classification Search
CPC ................................... G06F 8/51; G06F 8/313
See application file for complete search history.

(56) References Cited

U.S. PATENT DOCUMENTS

| | | | | | |
|---|---|---|---|---|---|
| 9,619,212 | B2 * | 4/2017 | Fige | ........................ | G06F 8/447 |
| 9,971,581 | B1 * | 5/2018 | Nandanuru | ............... | G06F 8/51 |
| 10,795,652 | B2 * | 10/2020 | Tejani | ........................ | G06F 8/51 |
| 10,831,475 | B2 * | 11/2020 | Hicks | ......................... | G06F 8/71 |
| 11,507,352 | B1 * | 11/2022 | Dolby | ......................... | G06F 8/35 |
| 11,656,851 | B2 * | 5/2023 | Clement | ............... | G06N 3/045 |
| | | | | | 717/106 |
| 11,797,281 | B2 * | 10/2023 | Ramsl | ........................ | G06F 8/73 |
| 11,934,815 | B2 * | 3/2024 | Ravindranath | ........... | G06F 8/51 |
| 11,972,232 | B2 * | 4/2024 | Clement | ............... | G06N 3/0455 |
| 12,014,160 | B2 * | 6/2024 | Singh | ......................... | G06F 8/73 |
| 12,039,295 | B2 * | 7/2024 | Allamanis | ................. | G06F 8/36 |
| 12,169,715 | B2 * | 12/2024 | Fu | ............................. | G06F 8/71 |
| 12,360,743 | B1 * | 7/2025 | Bui | ........................... | G06F 8/30 |
| 12,541,449 | B2 * | 2/2026 | Drain | ................. | G06F 11/3684 |
| 2014/0089894 | A1 * | 3/2014 | Elshishiny | ............... | G06F 8/70 |
| | | | | | 717/120 |
| 2020/0026577 | A1 * | 1/2020 | Dias | ........................ | G06F 18/23 |
| 2020/0097261 | A1 * | 3/2020 | Smith | ....................... | G06F 8/33 |
| 2021/0011694 | A1 * | 1/2021 | Ni | ............................. | G06F 8/53 |

(Continued)

FOREIGN PATENT DOCUMENTS

| | | | | | |
|---|---|---|---|---|---|
| CN | 115373691 | A | * 11/2022 | ............... | G06F 8/51 |

OTHER PUBLICATIONS

D.Kahneman, "Thinking, Fast and Slow", Macmillan, Feb. 2014, pp. 1-9.

(Continued)

*Primary Examiner* — Francisco J Aponte

(74) *Attorney, Agent, or Firm* — CHIP LAW GROUP

(57)          ABSTRACT

Methods and systems of translation include performing a search of translation hypotheses for input source code in a first programming language to a second programming language. A constraint is extracted from the input source code. The constraint is applied to the translation hypotheses to generate a source code output in the second programming language.

20 Claims, 8 Drawing Sheets

(56) References Cited

U.S. PATENT DOCUMENTS

| | | | | |
|---|---|---|---|---|
| 2021/0165610 | A1 | 6/2021 | Gilpin et al. | |
| 2021/0165640 | A1 | 6/2021 | Gilpin et al. | |
| 2021/0357210 | A1* | 11/2021 | Clement | G06N 3/084 |
| 2022/0214863 | A1* | 7/2022 | Clement | G06F 8/33 |
| 2022/0308845 | A1* | 9/2022 | Krishnamoorthy | G06F 8/36 |
| 2022/0308848 | A1* | 9/2022 | Clement | G06F 8/51 |
| 2023/0161567 | A1* | 5/2023 | Clement | G06N 3/044 |
| | | | | 717/106 |
| 2023/0195428 | A1* | 6/2023 | Deng | G06F 8/447 |
| | | | | 717/110 |
| 2023/0281318 | A1* | 9/2023 | Clement | G06F 8/33 |
| | | | | 726/25 |
| 2023/0305824 | A1* | 9/2023 | Allamanis | G06N 3/08 |
| 2023/0325164 | A1* | 10/2023 | Singh | G06F 8/51 |
| | | | | 717/137 |
| 2023/0350657 | A1* | 11/2023 | Singh | G06N 3/045 |
| 2024/0134614 | A1* | 4/2024 | Bakshi | G06F 8/65 |
| 2024/0176604 | A1* | 5/2024 | Hong | G06F 8/51 |
| 2024/0184555 | A1* | 6/2024 | De Toni | G06N 3/045 |

OTHER PUBLICATIONS

Nijkamp et al., "Codegen: an Open Large Language Model for Code With Multi-Turn Program Synthesis", arXiv:2203.13474v5 [cs.LG] Feb. 27, 2023, pp. 1-25.

Chen et al., "Evaluating Large Language Models Trained on Code", arXiv:2107.03374v2 [cs.LG] Jul. 14, 2021, pp. 1-35.

Post et al., "Fast Lexically Constrained Decoding with Dynamic Beam Allocation for Neural Machine Translation", arXiv:1804.06609v2 [cs.CL] Nov. 9, 2018, pp. 1-11.

Li et al., "Guided Generation of Cause and Effect", arXiv:2107.09846v1 [cs.CL] Jul. 21, 2021, pp. 1-8.

Anderson et al., "Guided Open Vocabulary Image Captioning with Constrained Beam Search", arXiv:1612.00576v2 [cs.CV] Jul. 19, 2017, pp. 1-14.

Hu et al., "Improved Lexically Constrained Decoding for Translation and Monolingual Rewriting", Proceedings of NAACL-HLT 2019, Jun. 2019, pp. 839-850.

Roziere et al., "Leveraging Automated Unit Tests for Unsupervised Code Translation", arXiv:2110.06773v2 [cs.SE] Feb. 16, 2022, pp. 1-20.

KC et al., "Neural Machine Translation for Code Generation", arXiv:2305.13504v1 [cs.CL] May 22, 2023, pp. 1-33.

Agarwal et al., "Quality Estimation & Interpretability for Code Translation", arXiv:2012.07581v2 [cs.SE] Apr. 26, 2021, pp. 1-7.

Gollapudi et al., "Semantic Rule-based Automatic Code conversion System", in 2020 International Conference on Data Science and Engineering (ICDSE) Dec. 3, 2020, pp. 1-5.

Poesia et al., "Synchromesh: Reliable Code Generation From Pre-Trained Language Models", arXiv:2201.11227v1 [cs.LG] Jan. 26, 2022, pp. 1-19.

Ahmad et al., "Unified Pre-training for Program Understanding and Generation", arXiv:2103.06333v2 [cs.CL] Apr. 10, 2021, pp. 1-14.

Lachaux et al., "Unsupervised Translation of Programming Languages", arXiv:2006.03511v3 [cs.CL] Sep. 22, 2020, pp. 1-21.

Doshi Ketan. "Foundations of NLP Explained Visually: Beam Search, How it Works", Apr. 1, 2021, Towards Data Science, 17 Pages.

No Author, "Introduction—Tree-Sitter", Sep. 5, 2023, 3 Pages.

No Author "Project CodeNet", IBM, May 6, 2021, 7 Pages.

\* cited by examiner

<u>102</u>

```
void areSame(int a, int b)
{
        if(a ^ b)
                cout << "Not same";
        else
                cout << "Same";
}
```

<u>104</u>

```
static void areSame(int a, int b)
{
        if ((a ^ b) != 0)
                System.out.print("Not same");
        else
                System.out.print("Same");
}
```

<u>106</u>

```
def areSame(a,b):

if ((a ^ b) != 0):
                print("Not same")
        else
                print("Same");
```

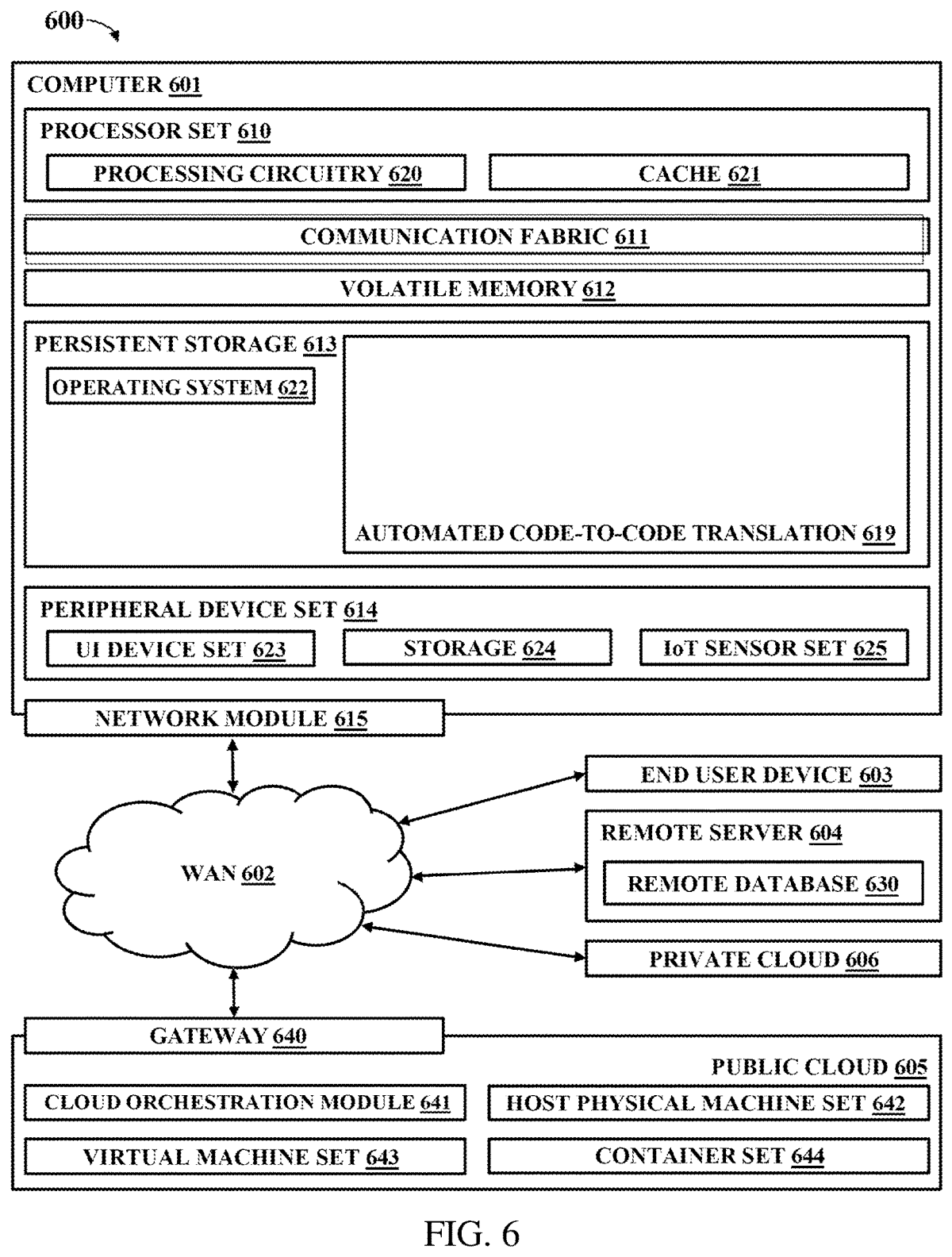

COMPUTER 601

PROCESSOR SET 610

| PROCESSING CIRCUITRY 620 | CACHE 621 |

COMMUNICATION FABRIC 611

VOLATILE MEMORY 612

PERSISTENT STORAGE 613

OPERATING SYSTEM 622

AUTOMATED CODE-TO-CODE TRANSLATION 619

PERIPHERAL DEVICE SET 614

| UI DEVICE SET 623 | STORAGE 624 | IoT SENSOR SET 625 |

NETWORK MODULE 615

WAN 602

END USER DEVICE 603

REMOTE SERVER 604

REMOTE DATABASE 630

PRIVATE CLOUD 606

GATEWAY 640

PUBLIC CLOUD 605

| CLOUD ORCHESTRATION MODULE 641 | HOST PHYSICAL MACHINE SET 642 |
| VIRTUAL MACHINE SET 643 | CONTAINER SET 644 |

FIG. 6

ACTOR-CRITIQUE CODE-TO-CODE TRANSLATION

BACKGROUND

The present invention generally relates to automatic source code translation and, more particularly, to code-to-code translation with quality assurances.

Machine learning systems are increasingly adept at translation from one language to another. While the applications of such translation to natural languages is immediately apparent, it also has applicability to programming languages, where source code in a first programming language may be automatically translated into working source code in a second programming language.

SUMMARY

A method of translation includes performing a search of translation hypotheses for input source code in a first programming language to a second programming language. A constraint is extracted from the input source code. The constraint is applied to the translation hypotheses to generate a source code output in the second programming language.

A system for translation includes a hardware processor and a memory that stores a computer program. When executed by the hardware processor, the computer program causes the hardware processor to perform a search of translation hypotheses for input source code in a first programming language to a second programming language. A constraint is extracted from the input source code. The constraint is applied to the translation hypotheses to generate a source code output in the second programming language.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein:

FIG. 1 is a diagram illustrating translation between functions written in different programming languages, according to an embodiment of the present invention;

FIG. 6 is a computer system that performs automated code-to-code translation, in accordance with an embodiment of the present invention;

DETAILED DESCRIPTION

Figure 2:
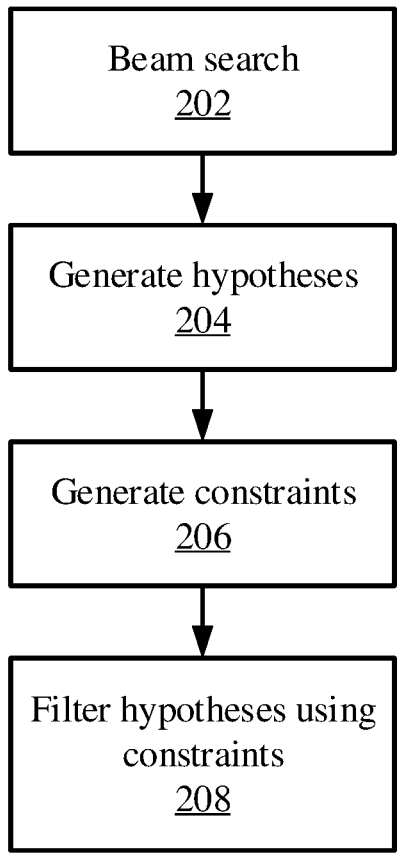
FIG. 2 is a block/flow diagram of a method of performing source code translation with constraints, in accordance with an embodiment of the present invention.

Translating between any two Turing-complete programming languages is theoretically always possible. For example, rules-based systems may convert code into structured objects, such as an abstract syntax tree or a control flow graph. Such a system may then apply rewrite rules to translate the source code from a first programming language into a second programming language. However, creating such systems may necessitate a large amount of manual work in crafting the rules, and expertise in both the source and target languages is needed. Furthermore, there may be challenges in translating from a dynamically typed language to a statically typed language.

Machine translation models can be used to perform code-to-code translation, but such models need to be trained on high-quality datasets, where known-equivalent samples of source code from the two languages are provided. Large language models can do code translation in a zero- or few-shot manner, where a pre-trained model is used and may be tuned for a particular translation task with a relatively small number of training samples.

Constraints may be extracted from the input source code, as described herein. These constraints may be used during the translation process to ensure that the output source code matches the input source code, both in function and in style. These constraints may be applied after a set of translation hypotheses are formed, or may be applied during the translation process. Applying the constraints can thereby improve the quality of the translated source code and can furthermore improve the speed of the translation process by removing from consideration branches that would violate constraints.

Referring now to FIG. 1, an exemplary code-to-code translation task is shown. A first code sample 102 is written in the C++ programming language, a second code sample 104 is written in another object oriented programming language, and a third code sample 106 is written in an interpreted programming language. Each of these samples performs the same operations in their respective regimes. In particular, they define a function that takes two inputs—'a' and 'b'—and that prints out whether or not the two inputs are the same after performing a comparison using the XOR operator.

However, the programming languages differ in their respective syntaxes and assumptions. For example, whereas the first two examples declare data types for the variables 'a' and 'b', the third example does not. Similarly, each language has its own functions and syntax for outputting text on a user interface.

To translate between these functions, a machine learning system needs training examples showing the source language and a target language, including examples of different syntaxes, operators, and primitives. The output source code in the second language generally needs to replicate the functionality of the first language. The output source code should also be logically precise and should follow the semantics expressed in the original source code.

However, machine learning systems often product imperfect outputs, and may make functional mistakes or may hallucinate new variable names or make other significant changes. Formal guarantees that certain constraints are obeyed may also be lacking. Evaluating the output source code may furthermore be challenging, as generating test cases poses its own problem by necessitating manual intervention.

Referring now to FIG. 2, a method for performing code-to-code translation is shown. Block 202 performs a beam search across a set of possible translations of an input source code sample, written in a source programming language, to a target programming language. A beam search performs a branching search that makes use of a language processing model, such as a large language model (LLM).

The beam search generates a set of possible translations of an input source code sample, written in a source programming language, to a target programming language. At each position in the output sequence, the beam search generates a set of potential next tokens, based on the conditional probabilities provided by the language model. Since there are many possible tokens at each position, the search limits the number of candidates to a fixed value, referred to herein as the beam width. The hypotheses with the highest conditional probabilities are retained, while the rest are pruned. New hypotheses are generated for each candidate token by appending the candidate token to a current hypothesis. The generated hypotheses are scored based on their cumulative conditional probabilities. This score may consider the probabilities of the tokens at each position in the hypothesis.

The language processing model may be any appropriate language processing model, including those designed for natural languages and those specifically directed to the conversion and generation of programming language source code. The beam search selects a best subset of possibilities at each step. At the next step, each element of the selected the best subset are evaluated in turn. This process is repeated until a set of hypotheses is generated in block 204.

The number of possibilities that are considered at each step of the beam search is determined by a beam size parameter N. A larger beam size will produce a more accurate translation, but will take correspondingly more time. Additionally, a beam search may need additional information, such as test cases, to identify the correct hypothesis. After generating multiple hypotheses, a correct hypothesis can be found that satisfies the test cases.

Block 206 therefore generates a set of constraints by analyzing the original source code. These constraints may be used to filter the hypotheses in block 208, with hypotheses that do not comply with the constraints being discarded. This can provide an equivalent implementation with greater certainty. Block 208 outputs one or more output source code samples that represent translations of the original source code into a target programming language.

The constraints may identify qualities in the original source code that need to be replicated in the output source code. Examples of such constraints include a number of variables in the output source code being the same as a number of variables in the input source code, names of variables in the output source code being the same as variables in the input source code, and data types of variables in the output source code being the same as variables in the input source code. Block 206 may analyze the input source code to generate particular values for such constraints, so that only hypotheses that meet them may be considered.

In such an embodiment, the beam search 202 may be allowed to generate hypotheses without online consideration of the constraints. The constraints may then be applied later, as shown, to ensure that the outputs are correct. However, generating a full set of hypotheses consumes time and computing resources, and may not be suitable for all applications.

Although block 206 is shown as occurring after the beam search 202 and corresponding generation of hypotheses 204, it should be understood that the constraints are generated independently of the hypotheses. As a result, constraints may be generated 206 before, or concurrently with, the beam search 202 and/or the generation of hypotheses 204.

Figure 3:
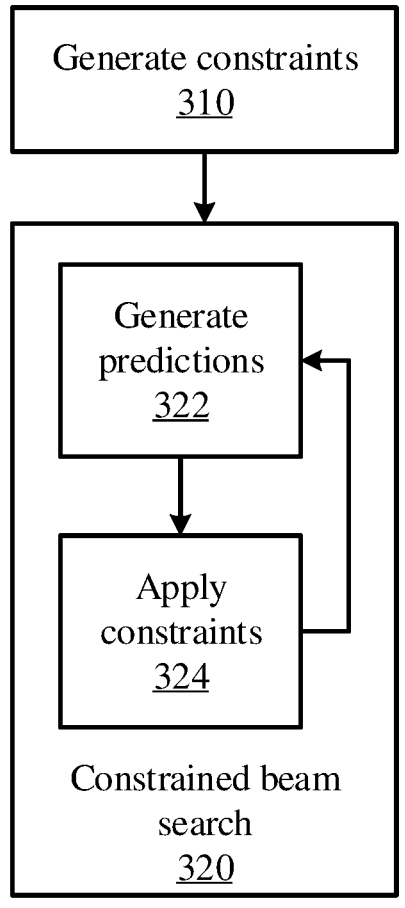
FIG. 3 is a block/flow diagram of a method of performing source code translation with constraints, in accordance with an embodiment of the present invention.

Referring now to FIG. 3, a method for performing code-to-code translation is shown. As above, block 310 generates constraints based on input source code that is written in a first programming language. A constrained beam search 320 is then performed, with block 322 generating predictions in the manner described above. At each step, block 324 may apply the constraints to limit the number of branches that the beam search may explore. For example, a hypothesis that includes a novel variable name—one which is not present in the input source code—may be avoided before wasting processing time considering downstream possibilities. Constraining the beam search in this fashion can greatly reduce the amount of processing power needed, effectively increasing the beam size that can be considered.

During the constrained beam search 320, a beam width controls the number of different hypotheses that are considered at each step. Applying the constraints at block 324 limits the hypotheses that are considered, for example by excluding any hypotheses that cannot satisfy the constraints. In some cases, the constraints may not affect the number of hypotheses that are considered during a next iteration of the beam search 320. In this case, pruning candidates makes room for the consideration of hypotheses that would not otherwise have been included in the beam width.

In some cases, the beam width may be applied before applying the constraints at block 324, such that pruning candidates in block 324 reduces the number of branches that are considered in the next step of the beam search. In some cases, a hybrid approach may be used, with two beam widths. A first beam width may represent a maximum beam width, representing the number of hypotheses that are considered in a next step when none are pruned by the constraints. A second beam width may represent a minimum beam width, representing a minimum number of hypotheses that are considered in a next step, even if every hypothesis is pruned by the constraints. Thus, additional hypotheses may be selected if the number of pruned hypotheses exceeds a threshold, to prevent a scenario where all of the selected hypotheses are pruned.

The constraints may be generated 310 according to one or more predetermined rules. For example, the input source code may be parsed to identify the names of variables, the types of variables, and constraints present in conditional (e.g., "if-then") blocks. This information may be extracted from the input source code and may be used in one or more constraint templates. Thus, after identifying the names of variables in the input source code, these names may be used in a constraint template that enforces the inclusion of all such variable names in the translated source code.

Semantic constraints like variables' names and data types of variables are simple to extract using a parser. More sophisticated program analysis techniques, such as data-flow analysis, can be used to find additional constraints between different variables in the program. Data-flow analysis involves examining data movement within a program using a control flow graph derived from the program's source code. Constraints may therefore be generated at different levels of granularity.

Applying the constraints as described above, whether after all hypotheses are generated or during the beam search, can provide a guarantee of implementation-wise equivalence between the output source code and the input source code. Such equivalence can be guaranteed provided there are enough constraints to enforce. A simple program may have few constraints compared to a longer, more complicated program. The ratio of the number of satisfied constraints in a particular translated program to the total number of constraints extracted from the input source code may be used as a score to determine the quality of the translation.

Figure 4:
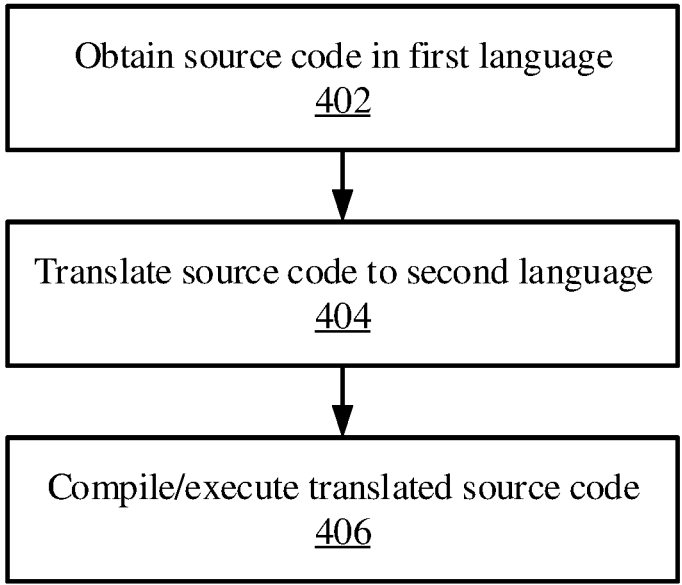
FIG. 4 is a block/flow diagram of a method of translating and executing source code, in accordance with an embodiment of the present invention.

Referring now to FIG. 4, a method for translating and using source code is shown. Block 402 obtains the source code in a first programming language. The source code may originally be written in any appropriate programming language. For example, the first programming language may be a relatively old, archaic, or uncommon programming language. For example, this occurs in legacy systems, where trained engineers who are proficient in the first programming language may be relatively scarce. Porting the source code to a more modern language can make the source code easier to maintain, as there are more people available to are able to work with it and adapt it to new problems.

Block 404 therefore translates the source code from the first language to the second language, as described in greater detail above. The translation may make use of an appropriate language model and may execute a beam search to identify hypotheses for the output source code. As noted above, the translation may make use of constraints that are automatically derived from the input source code, and which may be applied in an offline fashion (e.g., after a set of complete hypotheses has been generated), or in an online fashion (e.g., applying the constraints during execution of the beam search). In either case, the output is source code in the second programming language that complies with the constraints.

After the source code has been translated into the second language, the translated source code may be executed or compiled and may be deployed for use. Source code in an interpreted programming language may be executed directly, while source code in a compiled programming language may be compiled by an appropriate compiler. Deployment may include transferring the source code or a compiled binary to a computer system where it will be used.

Figure 5:
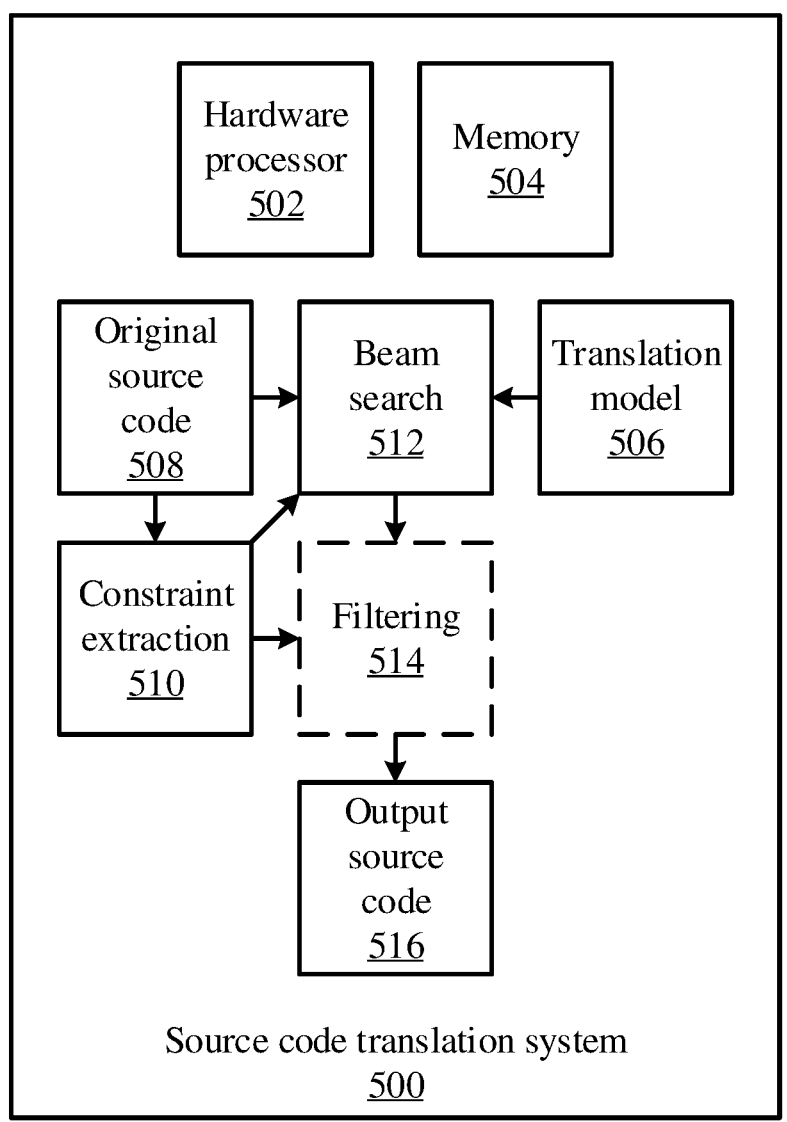
FIG. 5 is a block diagram of a source code translation system that performs a beam search with constraints, in accordance with an embodiment of the present invention.

Referring now to FIG. 5, a source code translation system 500 is shown. The system 500 may include a hardware processor 502 and a memory 504. The memory 504 may store computer program code that, when executed by the hardware processor, implements one or more functional modules.

Original source code 508, written in a first programming language, may be stored in the memory 504. A translation model 506 may also be stored in the memory 504 and may be trained to generate translation hypotheses in a second programming language when input with source code in the first programming language. A beam search 512 uses the translation model 506 to generate translation hypotheses for the original source code 508.

Constraint extraction also processes the original source code 508 to identify a set of relevant constraints. These constraints may be applied in an offline fashion, for example by filtering 514 the hypotheses output by the beam search 512, or in an online fashion, for example by limiting branches taken by the beam search 512. Output source code 516 that complies with the constraints is generated and may be executed or compiled as needed.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring now to FIG. 6, a computing environment 600 is shown. Computing environment 600 contains an example of an environment for the execution of at least some of the computer code involved in performing the inventive methods, such as automated code-to-code translation 619. In addition to block 619, computing environment 600 includes, for example, computer 601, wide area network (WAN) 602, end user device (EUD) 603, remote server 604, public cloud 605, and private cloud 606. In this embodiment, computer 601 includes processor set 610 (including processing circuitry 620 and cache 621), communication fabric 611, volatile memory 612, persistent storage 613 (including operating system 622 and block 619, as identified above), peripheral device set 614 (including user interface (UI) device set 623, storage 624, and Internet of Things (IoT) sensor set 625), and network module 615. Remote server 604 includes remote database 630. Public cloud 605 includes gateway 640, cloud orchestration module 641, host physical machine set 642, virtual machine set 643, and container set 644.

COMPUTER 601 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 630. As is well understood in the art of computer technology, and depending upon the technology, performance of a computer-implemented method may be distributed among multiple computers and/or between multiple locations. On the other hand, in this presentation of computing environment 600, detailed discussion is focused on a single computer, specifically computer 601, to keep the presentation as simple as possible. Computer 601 may be located in a cloud, even though it is not shown in a cloud in FIG. 6. On the other hand, computer 601 is not required to be in a cloud except to any extent as may be affirmatively indicated.

PROCESSOR SET 610 includes one, or more, computer processors of any type now known or to be developed in the future. Processing circuitry 620 may be distributed over multiple packages, for example, multiple, coordinated integrated circuit chips. Processing circuitry 620 may implement multiple processor threads and/or multiple processor cores. Cache 621 is memory that is located in the processor chip package(s) and is typically used for data or code that should be available for rapid access by the threads or cores running on processor set 610. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 601 to cause a series of operational steps to be performed by processor set 610 of computer 601 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 621 and the other storage media discussed below. The program instructions, and associated data, are accessed by processor set 610 to control and direct performance of the inventive methods. In computing environment 100, at least some of the instructions for performing the inventive methods may be stored in block 619 in persistent storage 613.

COMMUNICATION FABRIC 611 is the signal conduction path that allows the various components of computer 601 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 612 is any type of volatile memory now known or to be developed in the future. Examples include dynamic type random access memory (RAM) or static type RAM. Typically, volatile memory 612 is characterized by random access, but this is not required unless affirmatively indicated. In computer 601, the volatile memory 612 is located in a single package and is internal to computer 601, but, alternatively or additionally, the volatile memory may be distributed over multiple packages and/or located externally with respect to computer 601.

PERSISTENT STORAGE 613 is any form of non-volatile storage for computers that is now known or to be developed in the future. The non-volatility of this storage means that the stored data is maintained regardless of whether power is being supplied to computer 601 and/or directly to persistent storage 613. Persistent storage 613 may be a read only memory (ROM), but typically at least a portion of the persistent storage allows writing of data, deletion of data and re-writing of data. Some familiar forms of persistent storage include magnetic disks and solid state storage devices. Operating system 622 may take several forms, such as various known proprietary operating systems or open source Portable Operating System Interface-type operating systems that employ a kernel. The code included in block 619 typically includes at least some of the computer code involved in performing the inventive methods.

PERIPHERAL DEVICE SET 614 includes the set of peripheral devices of computer 601. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 623 may include components such as a display screen, speaker, microphone, wearable devices (such as goggles and smart watches), keyboard, mouse, printer, touchpad, game controllers, and haptic devices. Storage 624 is external storage, such as an external hard drive, or insertable storage, such as an SD card. Storage 624 may be persistent and/or volatile. In some embodiments, storage 624 may take the form of a quantum computing storage device for storing data in the form of qubits. In embodiments where computer 601 is required to have a large amount of storage (for example, where computer 601 locally stores and manages a large database) then this storage may be provided by peripheral storage devices designed for storing very large amounts of data, such as a storage area network (SAN) that is shared by multiple, geographically distributed computers. IoT sensor set 625 is made up of sensors that can be used in Internet of Things applications. For example, one sensor may be a thermometer and another sensor may be a motion detector.

NETWORK MODULE 615 is the collection of computer software, hardware, and firmware that allows computer 601 to communicate with other computers through WAN 602. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 615 are performed on the same physical hardware device. In other embodiments (for example, embodiments that utilize software-defined networking (SDN)), the control functions and the forwarding functions of network module 615 are performed on physically separate devices, such that the control functions manage several different network hardware devices. Computer readable program instructions for performing the inventive methods can typically be downloaded to computer 601 from an external computer or external storage device through a network adapter card or network interface included in network module 615.

WAN 602 is any wide area network (for example, the internet) capable of communicating computer data over non-local distances by any technology for communicating computer data, now known or to be developed in the future. In some embodiments, the WAN 012 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 603 is any computer system that is used and controlled by an end user (for example, a customer of an enterprise that operates computer 601), and may take any of the forms discussed above in connection with computer 601. EUD 603 typically receives helpful and useful data from the operations of computer 601. For example, in a hypothetical case where computer 601 is designed to provide a recommendation to an end user, this recommendation would typically be communicated from network module 615 of computer 601 through WAN 602 to EUD 603. In this way, EUD 603 can display, or otherwise present, the recommendation to an end user. In some embodiments, EUD 603 may be a client device, such as thin client, heavy client, mainframe computer, desktop computer and so on.

REMOTE SERVER 604 is any computer system that serves at least some data and/or functionality to computer 601. Remote server 604 may be controlled and used by the same entity that operates computer 601. Remote server 604 represents the machine(s) that collect and store helpful and useful data for use by other computers, such as computer 601. For example, in a hypothetical case where computer 601 is designed and programmed to provide a recommendation based on historical data, then this historical data may be provided to computer 601 from remote database 630 of remote server 604.

PUBLIC CLOUD 605 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 605 is performed by the computer hardware and/or software of cloud orchestration module 641. The computing resources provided by public cloud 605 are typically implemented by virtual computing environments that run on various computers making up the computers of host physical machine set 642, which is the universe of physical computers in and/or available to public cloud 605. The virtual computing environments (VCEs) typically take the form of virtual machines from virtual machine set 643 and/or containers from container set 644. It is understood that these VCEs may be stored as images and may be transferred among and between the various physical machine hosts, either as images or after instantiation of the VCE. Cloud orchestration module 641 manages the transfer and storage of images, deploys new instantiations of VCEs and manages active instantiations of VCE deployments.

Gateway 640 is the collection of computer software, hardware, and firmware that allows public cloud 605 to communicate through WAN 602.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 606 is similar to public cloud 605, except that the computing resources are only available for use by a single enterprise. While private cloud 606 is depicted as being in communication with WAN 602, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 605 and private cloud 606 are both part of a larger hybrid cloud.

Figure 7:
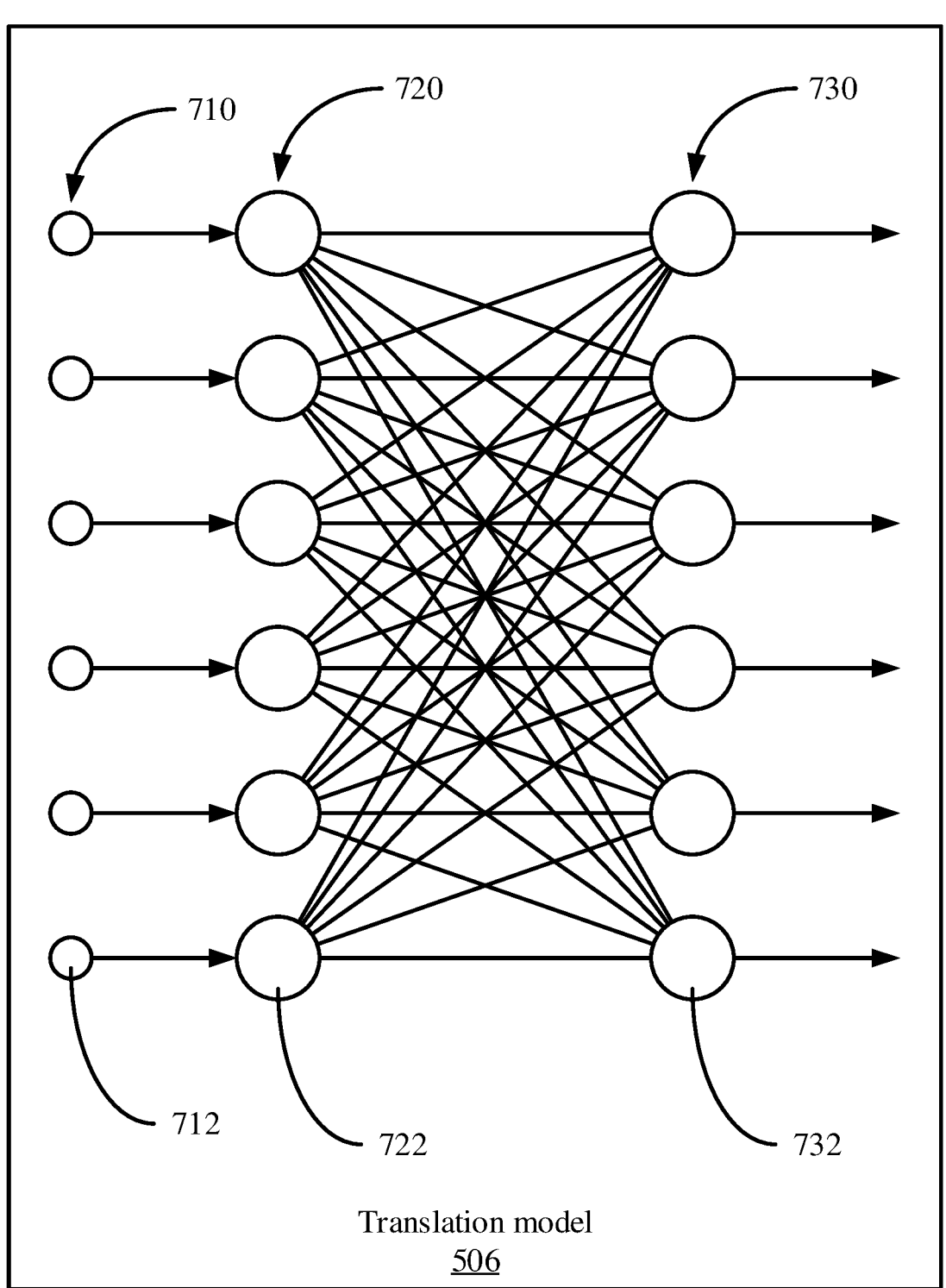
FIG. 7 is a diagram of an exemplary neural network architecture that can be used as part of a translation model, in accordance with an embodiment of the present invention.
Figure 8:
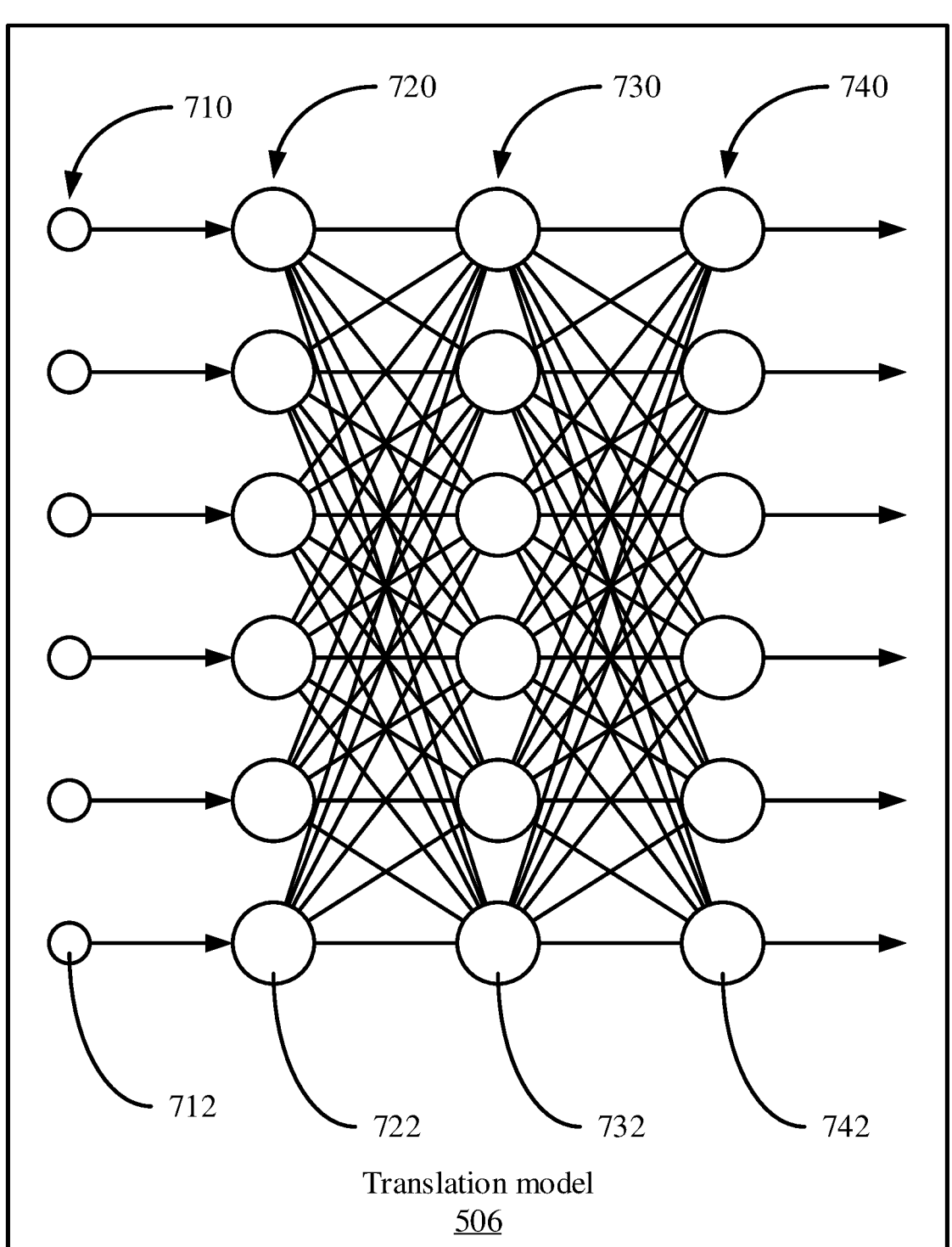
FIG. 8 is a diagram of an exemplary deep neural network architecture that can be used as part of a translation model, in accordance with an embodiment of the present invention.

Referring now to FIGS. 7 and 8, exemplary neural network architectures are shown, which may be used to implement parts of the present models. A neural network is a generalized system that improves its functioning and accuracy through exposure to additional empirical data. The neural network becomes trained by exposure to the empirical data. During training, the neural network stores and adjusts a plurality of weights that are applied to the incoming empirical data. By applying the adjusted weights to the data, the data can be identified as belonging to a particular predefined class from a set of classes or a probability that the inputted data belongs to each of the classes can be outputted.

The empirical data, also known as training data, from a set of examples can be formatted as a string of values and fed into the input of the neural network. Each example may be associated with a known result or output. Each example can be represented as a pair, (x, y), where x represents the input data and y represents the known output. The input data may include a variety of different data types, and may include multiple distinct values. The network can have one input node for each value making up the example's input data, and a separate weight can be applied to each input value. The input data can, for example, be formatted as a vector, an array, or a string depending on the architecture of the neural network being constructed and trained.

The neural network "learns" by comparing the neural network output generated from the input data to the known values of the examples, and adjusting the stored weights to minimize the differences between the output values and the known values. The adjustments may be made to the stored weights through back propagation, where the effect of the weights on the output values may be determined by calculating the mathematical gradient and adjusting the weights in a manner that shifts the output towards a minimum difference. This optimization, referred to as a gradient descent approach, is a non-limiting example of how training may be performed. A subset of examples with known values that were not used for training can be used to test and validate the accuracy of the neural network.

During operation, the trained neural network can be used on new data that was not previously used in training or validation through generalization. The adjusted weights of the neural network can be applied to the new data, where the weights estimate a function developed from the training examples. The parameters of the estimated function which are captured by the weights are based on statistical inference.

In layered neural networks, nodes are arranged in the form of layers. An exemplary simple neural network has an input layer 720 of source nodes 722, and a single computation layer 730 having one or more computation nodes 732 that also act as output nodes, where there is a single computation node 732 for each possible category into which the input example could be classified. An input layer 720 can have a number of source nodes 722 equal to the number of data values 712 in the input data 710. The data values 712 in the input data 710 can be represented as a column vector. Each computation node 732 in the computation layer 730 generates a linear combination of weighted values from the input data 710 fed into input nodes 720, and applies a non-linear activation function that is differentiable to the sum. The exemplary simple neural network can perform classification on linearly separable examples (e.g., patterns).

A deep neural network, such as a multilayer perceptron, can have an input layer 720 of source nodes 722, one or more computation layer(s) 730 having one or more computation nodes 732, and an output layer 740, where there is a single output node 742 for each possible category into which the input example could be classified. An input layer 720 can have a number of source nodes 722 equal to the number of data values 712 in the input data 710. The computation nodes 732 in the computation layer(s) 730 can also be referred to as hidden layers, because they are between the source nodes 722 and output node(s) 742 and are not directly observed. Each node 732, 742 in a computation layer generates a linear combination of weighted values from the values output from the nodes in a previous layer, and applies a non-linear activation function that is differentiable over the range of the linear combination. The weights applied to the value from each previous node can be denoted, for example, by $w_1, w_2, \ldots w_{n-1}, w_n$. The output layer provides the overall response of the network to the input data. A deep neural network can be fully connected, where each node in a computational layer is connected to all other nodes in the previous layer, or may have other configurations of connections between layers. If links between nodes are missing, the network is referred to as partially connected.

Training a deep neural network can involve two phases, a forward phase where the weights of each node are fixed and the input propagates through the network, and a backwards phase where an error value is propagated backwards through the network and weight values are updated.

The computation nodes 732 in the one or more computation (hidden) layer(s) 730 perform a nonlinear transformation on the input data 712 that generates a feature space. The classes or categories may be more easily separated in the feature space than in the original data space.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Having described preferred embodiments of actor-critique code-to-code translation (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer-implemented method for translation, comprising:

performing a beam search of translation hypotheses for
input source code in a first programming language to a
second programming language;
extracting a constraint from the input source code; and
applying the constraint to the translation hypotheses, after
a number of hypotheses are selected for consideration
in a next iteration of the beam search, to generate a
source code output in the second programming lan-
guage.

2. The method of claim 1, wherein applying the constraint
includes filtering a set of complete hypotheses generated by
the search.

3. The method of claim 1, wherein applying the constraint
includes limiting branches taken by the search according to
the constraint.

4. The method of claim 1, wherein the beam search uses
a translation model to generate the translation hypotheses.

5. The method of claim 4, wherein the constraint is
applied before a number of hypotheses are selected for
consideration in a next iteration of the beam search, and the
number of hypotheses is determined by a beam width.

6. The method of claim 4, wherein the number of hypoth-
eses is a beam width, reduced by a number of pruned
hypotheses.

7. The method of claim 6, wherein a number of additional
hypotheses are selected responsive to the number of pruned
hypotheses exceeding a threshold value.

8. The method of claim 4, wherein the constraint is
applied before a number of hypotheses are selected for
consideration in a next iteration of the beam search, such
that the number of hypotheses is maintained at a beam
width.

9. The method of claim 1, wherein the constraint is
selected from the group consisting of a number of variables
in the output source code being the same as a number of
variables in the input source code, names of variables in the
output source code being the same as variables in the input
source code, and data types of variables in the output source
code being the same as variables in the input source code.

10. The method of claim 1, further comprising compiling
or executing the source code output.

11. A computer program product for translation, the
computer program product comprising a computer readable
storage medium having program instructions embodied
therewith, the program instructions being executable by a
hardware processor to cause the hardware processor to:
perform a beam search of translation hypotheses for input
source code in a first programming language to a
second programming language;

extract a constraint from the input source code; and
apply the constraint to the translation hypotheses, after a
number of hypotheses are selected for consideration in
a next iteration of the beam search, to generate a source
code output in the second programming language.

12. A system for translation, comprising:
a hardware processor; and
a memory that stores a computer program which, when
executed by the hardware processor, causes the hard-
ware processor to:
perform a beam search of translation hypotheses for
input source code in a first programming language to
a second programming language;
extract a constraint from the input source code; and
apply the constraint to the translation hypotheses, after
a number of hypotheses are selected for consider-
ation in a next iteration of the beam search, to
generate a source code output in the second pro-
gramming language.

13. The system of claim 12, wherein the constraint filters
a set of complete hypotheses generated by the search.

14. The system of claim 12, wherein the constraint limits
branches taken by the search according to the constraint.

15. The system of claim 12, wherein the beam search uses
a translation model to generate the translation hypotheses.

16. The system of claim 15, wherein the constraint is
applied before a number of hypotheses are selected for
consideration in a next iteration of the beam search, and the
number of hypotheses is determined by a beam width.

17. The system of claim 15, wherein the number of
hypotheses is a beam width, reduced by a number of pruned
hypotheses.

18. The system of claim 17, wherein a number of addi-
tional hypotheses are selected responsive to the number of
pruned hypotheses exceeding a threshold value.

19. The system of claim 15, wherein the constraint is
applied before a number of hypotheses are selected for
consideration in a next iteration of the beam search, such
that the number of hypotheses is maintained at a beam
width.

20. The system of claim 12, wherein the constraint is
selected from the group consisting of a number of variables
in the output source code being the same as a number of
variables in the input source code, names of variables in the
output source code being the same as variables in the input
source code, and data types of variables in the output source
code being the same as variables in the input source code.

* * * * *